United States Patent
Li et al.

(10) Patent No.: US 12,013,608 B2
(45) Date of Patent: Jun. 18, 2024

(54) LIQUID CRYSTAL LENS AND ELECTRONIC DEVICE

(71) Applicant: BOE TECHNOLOGY GROUP CO., LTD., Beijing (CN)

(72) Inventors: Zhongxiao Li, Beijing (CN); Pengxia Liang, Beijing (CN); Zhiqiang Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/006,983

(22) PCT Filed: Feb. 28, 2022

(86) PCT No.: PCT/CN2022/078288
§ 371 (c)(1),
(2) Date: Aug. 31, 2023

(87) PCT Pub. No.: WO2023/159565
PCT Pub. Date: Aug. 31, 2023

(65) Prior Publication Data
US 2024/0027822 A1 Jan. 25, 2024

(51) Int. Cl.
*G02F 1/1335* (2006.01)
*G02F 1/1343* (2006.01)

(52) U.S. Cl.
CPC .. *G02F 1/133526* (2013.01); *G02F 1/134336* (2013.01)

(58) Field of Classification Search
CPC .................. G02F 1/133526; G02F 1/134336
See application file for complete search history.

(56) References Cited

U.S. PATENT DOCUMENTS

2013/0063691 A1* 3/2013 Takama ............... G02F 1/29
349/143
2015/0002765 A1 1/2015 Liu et al.
(Continued)

FOREIGN PATENT DOCUMENTS

| CN | 102967969 A | 3/2013 |
| CN | 103926748 A | 7/2014 |

(Continued)

*Primary Examiner* — Priyank J Shah
(74) *Attorney, Agent, or Firm* — DINSMORE & SHOHL LLP

(57) ABSTRACT

Provided are a liquid crystal lens and an electronic device. The lens includes a first and a second substrate structure; and an intermediate layer. The second substrate structure includes a second substrate; at least one electrode structure, each electrode structure including N groups of second electrodes, each group of which including M second electrodes. Orthographic projections of i-th group of second electrodes is within that of i-th intermediate portion. Each intermediate portion includes a liquid crystal layer, and j-th intermediate portion includes at least one of a first to fourth barrier walls. The liquid crystal lens is configured such that i-th intermediate portion constitutes a part of i-th stage Fresnel ring of a Fresnel zone plate, and optical paths of portions of i-th intermediate portion gradually decrease along the first direction, in a case where a predetermined voltage is between N groups of second electrodes and the first electrode.

20 Claims, 11 Drawing Sheets

(56) References Cited

U.S. PATENT DOCUMENTS

| | | | |
|---|---|---|---|
| 2015/0219910 | A1 | 8/2015 | Jang et al. |
| 2016/0313612 | A1 | 10/2016 | Wu et al. |
| 2017/0269453 | A1 | 9/2017 | Galstian et al. |
| 2021/0405394 | A1 | 12/2021 | Li et al. |

FOREIGN PATENT DOCUMENTS

| | | |
|---|---|---|
| CN | 104317133 A | 1/2015 |
| CN | 107209437 A | 9/2017 |
| CN | 110286529 A | 9/2019 |
| CN | 110412810 A | 11/2019 |
| CN | 211603594 U | 9/2020 |
| KR | 20090089611 A | 8/2009 |

\* cited by examiner

LIQUID CRYSTAL LENS AND ELECTRONIC DEVICE

CROSS-REFERENCE TO RELATED APPLICATIONS

The present application is a U.S. National Stage Application under 35 U.S.C. § 371 of International Patent Application No. PCT/CN2022/078288, filed on Feb. 28, 2022, the disclosure of which is incorporated by reference herein in its entirety.

TECHNICAL FIELD

The present disclosure relates to a liquid crystal lens and an electronic device.

BACKGROUND

The liquid crystal lens which has the advantages such as switchable and variable focus, may be applied in some devices or used independently.

In the related art, the liquid crystal lens based on the Fresnel zone plate may be used to reduce the thickness and response time of the liquid crystal lens.

SUMMARY

According to one aspect of the embodiments of the present disclosure, a liquid crystal lens is provided. The liquid crystal lens comprises: a first substrate structure comprising a first substrate and a first electrode located on one side of the first substrate; a second substrate structure located on one side of the first electrode away from the first substrate; and an intermediate layer located between the first substrate structure and the second substrate structure, and comprising N intermediate portions arranged sequentially from 1 to N along the first direction. The second substrate structure comprises: a second substrate; at least one electrode structure located between the first electrode and the second substrate, each electrode structure of the at least one electrode structure comprising N groups of second electrodes arranged sequentially from 1 to N along a first direction corresponding to each electrode structure, each group of second electrodes of the N groups of second electrodes comprising M second electrodes arranged sequentially from 1 to M along the first direction, where N and M are integers greater than or equal to 2; and an insulating layer located on one side of the at least one electrode structure away from the second substrate and covering the at least one electrode structure. Orthographic projections of i-th group of second electrodes on the second substrate is located within an orthographic projection of i-th intermediate portion of the N intermediate portions on the second substrate, and the orthographic projection of the i-th intermediate portion on the second substrate does not overlap with orthographic projections of other groups of second electrodes than the i-th group of second electrodes in the N group of second electrodes, where 1≤i≤N. Each intermediate portion of the N intermediate portions comprises a liquid crystal layer, j-th intermediate portion of the N intermediate portions comprises at least one barrier wall of a plurality of barrier walls comprising a first barrier wall, a second barrier wall, a third barrier wall and a fourth barrier wall, wherein the first barrier wall is located on one side of a first second electrode in j-th group of second electrodes away from M-th second electrode in the j-th group of second electrodes, the second barrier wall is located on one side of the M-th second electrode in the j-th group of second electrodes away from the first second electrode in the j-th group of second electrodes, an orthographic projection of the third barrier wall on the second substrate is located within an orthographic projection of the first second electrode in the j-th group of second electrodes on the second substrate, and an orthographic projection of the fourth barrier wall on the second substrate is located within an orthographic projection of the M-th second electrode in the j-th group of second electrodes on the second substrate, where j is one or more integers of 1 to N. The liquid crystal lens is configured such that the i-th intermediate portion constitutes a part of i-th stage Fresnel ring of a Fresnel zone plate, and optical paths of a plurality of portions of the i-th intermediate portion arranged along the first direction gradually decrease along the first direction, in a case where a predetermined voltage is present between the N groups of second electrodes and the first electrode.

In some embodiments, the j-th intermediate portion comprises at least one of the first barrier wall or the second barrier wall.

In some embodiments, each intermediate portion comprises at least one of the first barrier wall or the second barrier wall.

In some embodiments, a refractive index of at least one of the first barrier wall or the third barrier is greater than an ordinary light refractive index of the liquid crystal layer.

In some embodiments, a refractive index of at least one of the second barrier wall or the fourth barrier wall is smaller than an extraordinary light refractive index of the liquid crystal layer.

In some embodiments, the at least one barrier wall and the N groups of second electrodes extend along a second direction not parallel to the first direction, and the second direction is the same as a long axis direction of liquid crystal in the liquid crystal layer.

In some embodiments, the second direction is perpendicular to the first direction.

In some embodiments, a barrier wall in at least one intermediate portion is in contact with the first electrode and the insulating layer.

In some embodiments, a surface of the barrier wall away from the second substrate has a recessed region not in contact with the first electrode, and a region of the surface other than the recessed region is in contact with the first electrode.

In some embodiments, a ratio of a height of the at least one barrier wall to a thickness of the liquid crystal layer is greater than or equal to 0.8 and smaller than or equal to 1.

In some embodiments, orthographic projection of the at least one barrier wall on the second substrate is in a rectangular shape.

In some embodiments, the at least one barrier wall is in a rectangular parallelepiped shape.

In some embodiments, a shape of a cross section of the at least one barrier wall taken by a plane parallel to a surface of the second substrate is trapezoid.

In some embodiments, the trapezoid comprises: a first side and a second side that are parallel; a third side and a fourth side that are not parallel and both connected to the first side and the second side, wherein a first comprised angle between the first side and the third side is smaller than a second comprised angle between the second side and the third side, and the first comprised angle is greater than or equal to 85 degrees.

In some embodiments, the i-th intermediate portion comprises at least one of the first barrier wall or the second barrier wall, wherein: in the cross section of the first barrier wall, the second side is more proximate to the second substrate than the first side; and in the cross section of the second barrier wall, the first side is more proximate to the second substrate than the second side.

In some embodiments, an absolute value of a difference between a refractive index of the at least one barrier wall and an extraordinary light refractive index of the liquid crystal layer is smaller than or equal to 0.1.

In some embodiments, the M second electrodes comprise a first group of electrodes and a second group of electrodes, and the insulating layer comprises: a first insulating layer located between the first group of electrodes and the second group of electrodes; and a second insulating layer located on one side of the second group of electrodes away from the second substrate and covering the second group of electrodes, wherein one second electrode of any two adjacent second electrodes in the M second electrodes belongs to the first group of electrodes, and the other second electrode of the any two adjacent second electrodes belongs to the second group of electrodes.

In some embodiments, an edge of an orthographic projection of the one second electrode on the second substrate proximate to the other second electrode completely coincides with an edge of an orthographic projection of the other second electrode on the second substrate proximate to the one second electrode.

In some embodiments, the liquid crystal lens is configured such that the i-th intermediate portion constitutes the i-th stage Fresnel ring of the Fresnel zone plate, in a case where a same voltage is present between k-th second electrode in different groups of second electrodes of the N group of second electrodes and the first electrode, and different voltages are present between different second electrodes in a same group of second electrodes and the first electrode, where $1 \leq k \leq M$.

In some embodiments, the at least one electrode structure comprises a first electrode structure and a second electrode structure that are axially symmetrical, and the first direction corresponding to the first electrode structure is opposite to the first direction corresponding to the second electrode structure.

According to another aspect of the embodiments of the present disclosure, an electronic device is provided. The electronic device comprises the liquid crystal lens according to any one of the above embodiments.

According to still another aspect of the embodiments of the present disclosure, a control method of the liquid crystal lens according to any one of the above embodiments is provided. The control method comprises: controlling a predetermined voltage to be present between the N groups of second electrodes and the first electrode, such that the i-th intermediate portion constitutes a part of i-th stage Fresnel ring of a Fresnel zone plate, and optical paths of a plurality of portions of the i-th intermediate portion arranged along the first direction gradually decrease along the first direction.

In some embodiments, controlling a predetermined voltage to be present between the N groups of second electrodes and the first electrode comprises: controlling a same voltage to be present between k-th second electrode in different groups of second electrodes of the N groups of second electrodes and the first electrode, where $1 \leq k \leq M$; and controlling different voltages to be present between different second electrodes in a same group of second electrodes of the N groups of second electrodes and the first electrode.

According to yet still another aspect of the embodiments of the present disclosure, a manufacturing method of a liquid crystal lens is provided. The manufacturing method comprises: providing a first substrate structure, wherein the first substrate structure comprises a first substrate and a first electrode located on one side of the first substrate; providing a second substrate structure; and forming an intermediate layer located between the first substrate structure and the second substrate structure. The second substrate structure comprises: a second substrate; at least one electrode structure located on one side of the second substrate, each electrode structure of the at least one electrode structure comprising N groups of second electrodes arranged sequentially from 1 to N along a first direction corresponding to each electrode structure, each group of second electrodes of the N groups of second electrodes comprising M second electrodes arranged sequentially from 1 to M along the first direction, where N and M are integers greater than or equal to 2; and an insulating layer located on one side of the at least one electrode structure away from the second substrate and covering the at least one electrode structure. The intermediate layer comprises N intermediate portions arranged sequentially from 1 to N along the first direction, after the intermediate layer is formed, the second substrate structure is located on one side of the first electrode away from the first substrate, and the at least one electrode structure is located between the first electrode and the second substrate. Orthographic projections of i-th group of second electrodes on the second substrate is located within an orthographic projection of i-th intermediate portion of the N intermediate portions on the second substrate, and the orthographic projection of the i-th intermediate portion on the second substrate does not overlap with orthographic projections of other groups of second electrodes than the i-th group of second electrodes in the N group of second electrodes, where $1 \leq i \leq N$. Each intermediate portion of the N intermediate portions comprises a liquid crystal layer, j-th intermediate portion of the N intermediate portions comprises at least one barrier wall of a plurality of barrier walls comprising a first barrier wall, a second barrier wall, a third barrier wall and a fourth barrier wall, wherein the first barrier wall is located on one side of a first second electrode in j-th group of second electrodes away from M-th second electrode in the j-th group of second electrodes, the second barrier wall is located on one side of the M-th second electrode in the j-th group of second electrodes away from the first second electrode in the j-th group of second electrodes, an orthographic projection of the third barrier wall on the second substrate is located within an orthographic projection of the first second electrode in the j-th group of second electrodes on the second substrate, and an orthographic projection of the fourth barrier wall on the second substrate is located within an orthographic projection of the M-th second electrode in the j-th group of second electrodes on the second substrate, where j is one or more integers of 1 to N. The i-th intermediate portion constitutes a part of i-th stage Fresnel ring of a Fresnel zone plate, and optical paths of a plurality of portions of the i-th intermediate portion arranged along the first direction gradually decrease along the first direction, in a case where a predetermined voltage is present between the N groups of second electrodes and the first electrode.

BRIEF DESCRIPTION OF THE ACCOMPANYING DRAWINGS

The accompanying drawings which constitute a part of this specification, illustrate the embodiments of the present disclosure, and together with this specification, serve to explain the principles of the present disclosure.

The present disclosure can be more explicitly understood from the following detailed description with reference to the accompanying drawings, in which.

Figure 1A:
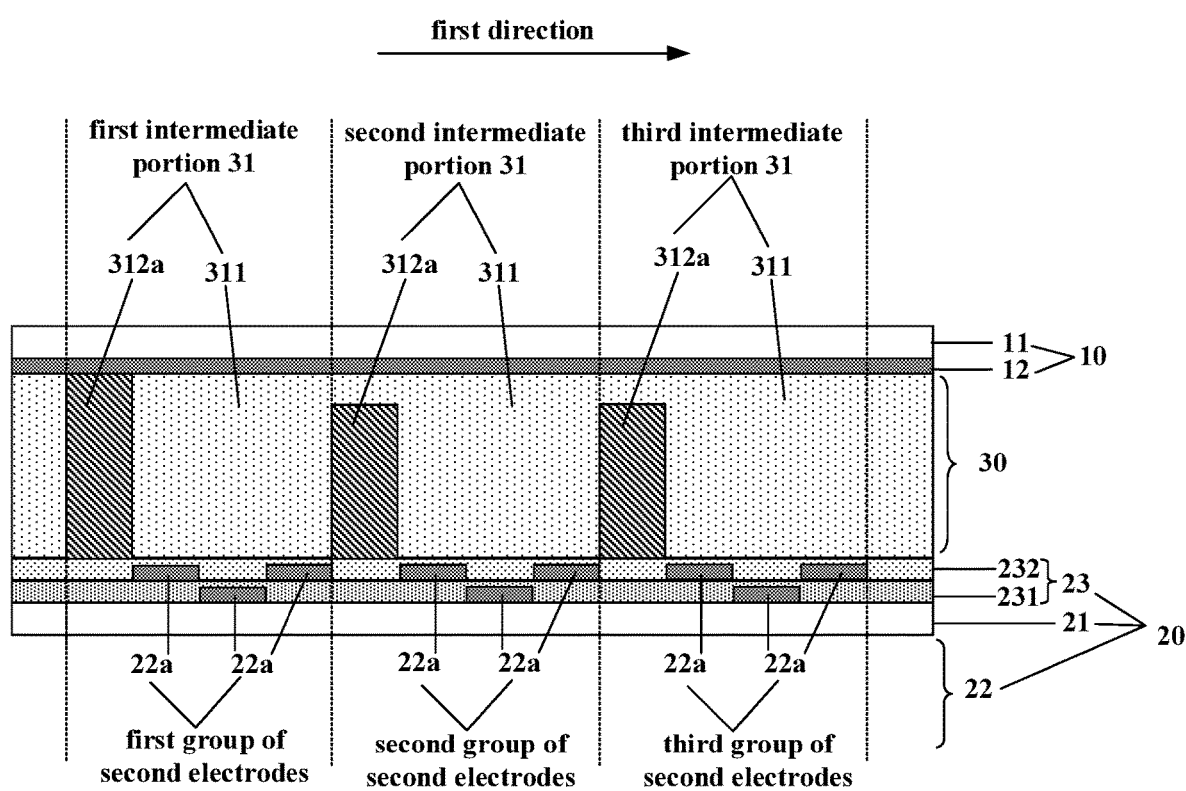
FIGS. 1A-1D are schematic structural views of a liquid crystal lens according to some embodiments of the present disclosure.

It should be understood that the dimensions of various parts shown in the accompanying drawings are not necessarily drawn according to actual proportional relations. In addition, the same or similar components are denoted by the same or similar reference signs.

DETAILED DESCRIPTION

Various exemplary embodiments of the present disclosure will now be described in detail with reference to the accompanying drawings. The following description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" and similar words in the present disclosure do not denote any order, quantity, or importance, but are merely used to distinguish between different parts. A word such as "comprise", "have" or variants thereof means that the element before the word covers the element(s) listed after the word without excluding the possibility of also covering other elements. The terms "up", "down", or the like are used only to represent a relative positional relationship, and the relative positional relationship may be changed correspondingly if the absolute position of the described object changes.

In the present disclosure, when it is described that a specific component is disposed between a first component and a second component, there may be an intervening component between the specific component and the first component or between the specific component and the second component. When it is described that a specific part is connected to other parts, the specific part may be directly connected to the other parts without an intervening part, or not directly connected to the other parts with an intervening part.

Unless otherwise defined, all terms (including technical and scientific terms) used herein have the same meanings as the meanings commonly understood by one of ordinary skill in the art to which the present disclosure belongs. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

The inventors have noticed that, the liquid crystal lens based on the Fresnel zone plate in the related art has a poor focusing effect. After analysis, the inventors have found that, the topography at a junction position of adjacent two stage Fresnel rings formed by liquid crystal has an inclined surface, so that there is a transition zone between two stage adjacent Fresnel rings. The presence of this transition zone will lead to light divergence instead of light focusing, thereby reducing the focusing effect of the liquid crystal lens.

In view showing this, the embodiments of the present disclosure provide the following technical solution.

FIGS. 1A-1D are schematic structural views of a liquid crystal lens according to some embodiments of the present disclosure.

As shown in FIGS. 1A-1D, the liquid crystal lens comprises a first substrate structure 10, a second substrate structure 20, and an intermediate layer 30 located between the first substrate structure 10 and the second substrate structure 20.

First, the first substrate structure 10 will be introduced.

The first substrate structure 10 comprises a first substrate 11, and a first electrode 12 located on one side of the first substrate 11. As some implementations, the first substrate 11 is a transparent substrate such as a glass substrate. As some implementations, the material of the first electrode 12 comprises indium tin oxide (ITO). Here, the first electrode 12 may also be referred to as a common electrode.

Next, the second substrate structure 20 will be introduced.

The second substrate structure 20 is located on one side of the first electrode 12 away from the first substrate 11. For example, referring to FIGS. 1A-1D, the first substrate 11 is schematically shown on the upper side of the first electrode 12, and the second substrate structure 20 is schematically shown on the lower side of the first electrode 12. The second substrate structure 20 comprises a second substrate 21, at least one electrode structure 22 and an insulating layer 23. The electrode structure 22 is located between the first electrode 12 and the second substrate 21, and the insulating layer 23 is located on one side of the electrode structure 22 away from the second substrate 21 and covers the electrode structure 22.

Similar to the first substrate 11, the second substrate 21 may be, for example, a transparent substrate such as a glass substrate. Each electrode structure 22 comprises N groups of second electrodes arranged sequentially from 1 to N along a first direction corresponding to each electrode structure 22, that is, the first group of second electrodes to the N-th group of second electrodes are arranged sequentially along the first direction. Each group of second electrodes comprise M second electrodes 22a which are arranged sequentially from 1 to M along the first direction, that is, the first second electrode 22a to the M-th second electrode 22a are arranged sequentially along the first direction. Here, N and M are integers greater than or equal to 2. For example, in FIGS. 1A and 1B, N and M are both schematically shown as 3. In FIGS. 1C and 1D, N is schematically shown as 3, and M is schematically shown as 4.

It should be noted that, two adjacent second electrodes 22a of M second electrodes 22a in each group of second electrodes may be located on the surface of a same layer or on the surfaces of different layers. Accordingly, the insulating layer 23 may be a single layer structure, or a multi-layer structure. Detailed description will be made in conjunction with some embodiments later.

Next, the intermediate layer 30 will be introduced.

The intermediate layer 30 comprises N intermediate portions 31 arranged sequentially from 1 to N along the first direction, that is, the first intermediate portion 31 to the N-th intermediate portion 31 are arranged sequentially along the first direction.

The relationship between the N groups of second electrodes and the N intermediate portions 31 will be introduced below.

The orthographic projections of the i-th group of second electrodes on the second substrate 21 is located within the orthographic projection of the i-th intermediate portion 31 on the second substrate 21, where 1≤i≤N. For example, the orthographic projections of the first group of second electrodes on the second substrate 21 is located within the orthographic projection of the first intermediate portion 31 on the second substrate 21, the orthographic projections of the second group of second electrodes on the second substrate 21 is located within the orthographic projection of the second intermediate portion 31 on the second substrate 21, and so forth.

In addition, the orthographic projection of the i-th intermediate portion 31 on the second substrate 21 does not overlap with the orthographic projections of other groups of second electrodes than the i-th group of second electrodes among the N groups of second electrodes on the second substrate 21. Taking N as 3 as an example, the orthographic projection of the first intermediate portion 31 on the second substrate 21 does not overlap with the orthographic projections of the second groups of electrodes and the third groups of electrodes on the second substrate 21, and the orthographic projection of the second intermediate portion 31 on the second substrate 21 does not overlap with the orthographic projections of the first groups of second electrodes and the third groups of second electrodes on the second substrate 21, and so forth.

Figure 1B:
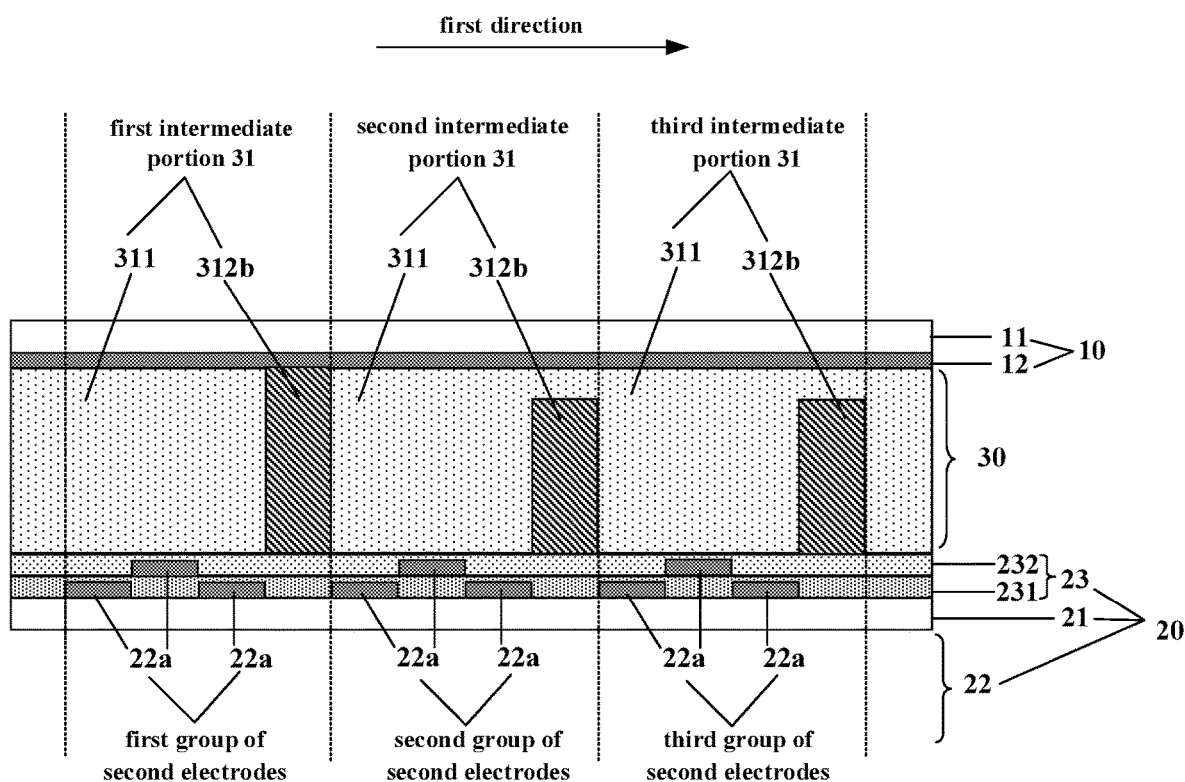
Figure 1C:
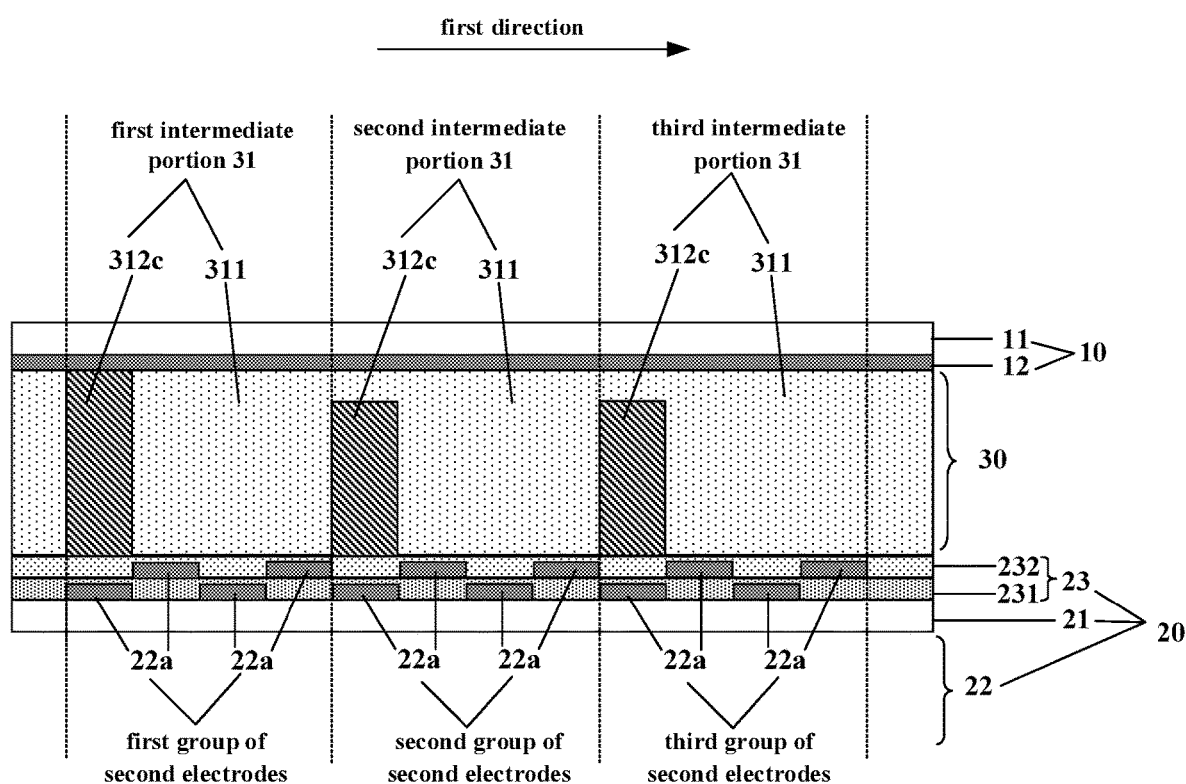
Figure 1D:
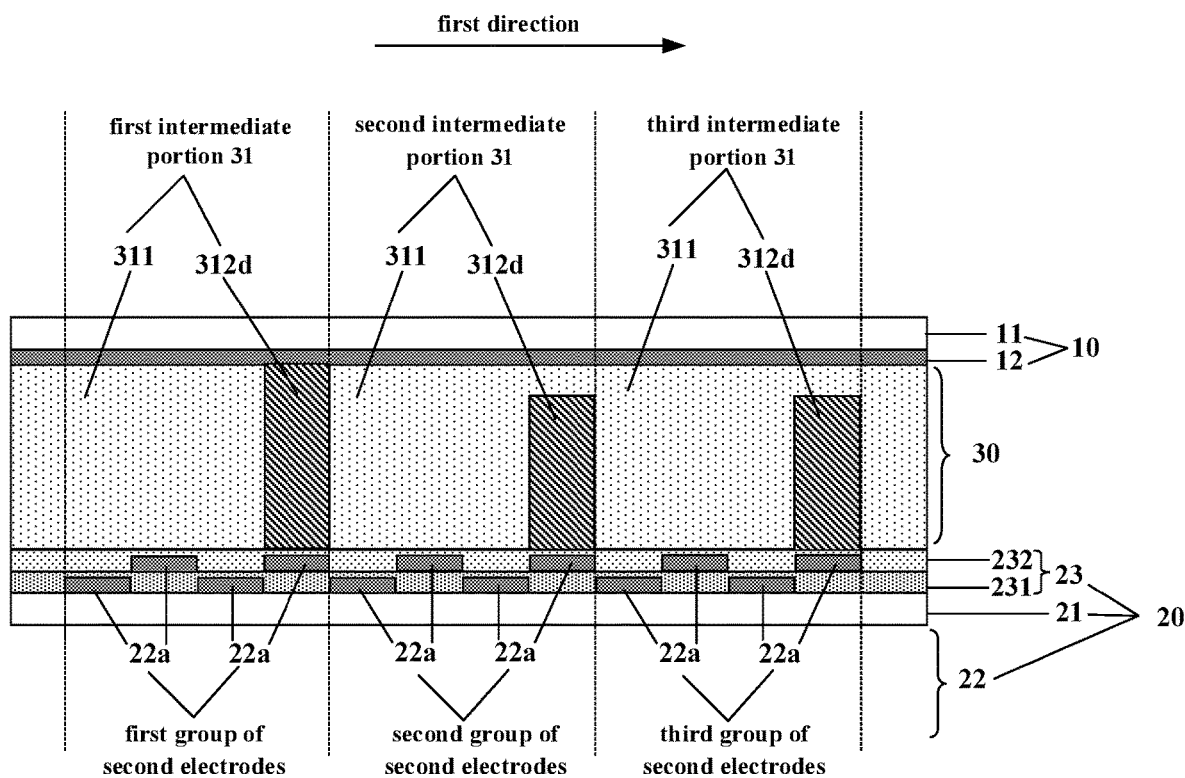

In some embodiments, referring to FIGS. 1A and 1B, the area of the orthographic projections of the i-th group of second electrodes on the second substrate 21 is smaller than the area of the orthographic projection of the i-th intermediate portion 31 on the second substrate 21. In other embodiments, the area of the orthographic projections of the i-th group of second electrodes on the second substrate 21 is the same as the area of the orthographic projection of the i-th intermediate portion 31 on the second substrate 21.

As shown in FIGS. 1A-1D, each intermediate portion 31 of the N intermediate portions 31 comprises a liquid crystal layer 311, and the j-th intermediate portion 31 comprises at least one of a plurality of barrier walls. The plurality of barrier walls comprises a first barrier wall 312a, a second barrier wall 312b, a third barrier wall 312c, and a fourth barrier wall 312d. Here, j is one or more integers of 1 to N. In other words, one or more intermediate portions 31 may comprise at least one barrier wall. For example, N=3, and j is 1, 2 and 3. In this case, each intermediate portion 31 of three intermediate portions 31 comprises at least one barrier wall. In some embodiments, the material of at least one of the plurality of barrier walls comprises resin.

The first barrier wall 312a, the second barrier wall 312b, the third barrier wall 312c and the fourth barrier wall 312d will be described below in conjunction with FIGS. 1A-1D.

As shown in FIG. 1A, the first barrier wall 312a in the j-th intermediate portion 31 is located on one side of the first second electrode 22a of the j-th group of second electrodes away from the M-th second electrode 22a of the j-th group of second electrodes. For example, the first barrier wall 312a of the first group of second electrodes is located on one side of the first second electrode 22a in the first group of second electrodes away from the M-th second electrode 22a in the first group of second electrodes, the first barrier wall 312a in the second group of second electrodes is located on one side of the first second electrode 22a in the second group of second electrodes away from the M-th second electrode 22a in the second group of second electrodes, and so forth.

As shown in FIG. 1B, the second barrier wall 312b in the j-th intermediate portion 31 is located on one side of the M-th second electrode 22a in the j-th group of second electrodes away from the first second electrode 22a in the j-th group of second electrodes. For example, the second barrier wall 312b in the first group of second electrodes is located on one side of the M-th second electrode 22a in the first group of second electrodes away from the first second electrode 22a in the first group of second electrodes, the second barrier wall 312b in the second group of second electrodes is located on one side of the M-th second electrode 22a in the second group of second electrodes away from the first second electrode 22a in the second group of second electrodes, and so forth.

As shown in FIG. 1C, the orthographic projection of the third barrier wall 312c in the j-th intermediate portion 31 on the second substrate 21 is located within the orthographic projection of the first second electrode 22a in the j-th group of second electrodes on the second substrate 21. For example, the orthographic projection of the third barrier wall 312c in the first group of second electrodes on the second substrate 21 is located within the orthographic projection of the first second electrode 22a in the first group of second electrodes on the second substrate 21, the orthographic projection of the third barrier wall 312c in the second group of second electrodes on the second substrate 21 is located within the orthographic projection of the first second electrode 22a in the second group of second electrodes on the second substrate 21, and so forth.

As shown in FIG. 19, the orthographic projection of the fourth barrier wall 312d in the j-th intermediate portion 31 on the second substrate 21 is located within the orthographic projection of the M-th second electrode 22a in the j-th group of second electrodes on the second substrate 21. For example, the orthographic projection of the fourth barrier wall 312d in the first intermediate portion 31 on the second substrate 21 is located within the orthographic projection of the M-th second electrode 22a in the first group of second electrodes on the second substrate 21, the orthographic projection of the fourth barrier wall 312d in the second intermediate portion 31 is located within the orthographic projection of the M-th second electrode 22a in the second group of second electrodes on the second substrate 21.

It should be understood that, FIGS. 1A-1D show the case where N=3 and j are 1, 2 and 3. In some embodiments, j may be one or two of 1, 2 and 3, that is, not each intermediate portion 31 comprises a barrier wall.

The liquid crystal lens shown in FIGS. 1A-1D is configured such that the i-th intermediate portion 31 constitutes a part of the i-th stage Fresnel ring of a Fresnel zone plate, and optical paths of a plurality of portions of the i-th intermediate portion 31 arranged along the first direction gradually decrease along the first direction, in a case where a predetermined voltage is present between the N groups of second electrodes and the first electrodes 12. Description will be made below in conjunction with FIGS. 2A and 2B.

Figure 2A:
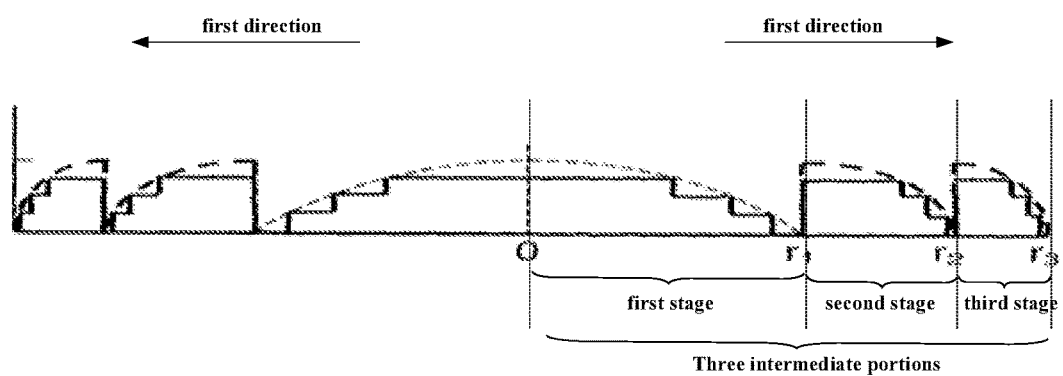
FIG. 2A is a schematic view showing a correspondence relationship between intermediate portions and the Fresnel ring according to an embodiment of the present disclosure.

FIG. 2A is a schematic view showing a correspondence relationship between intermediate portions and the Fresnel ring according to an embodiment of the present disclosure. In FIG. 2A, ri is half of the inner diameter of the i-th stage Fresnel ring, that is, the radius of the i-th half-wave zone.

As shown in FIG. 2A, the first intermediate portion 31 constitutes a part of the first stage Fresnel ring of the Fresnel zone plate, the second intermediate portion 31 constitutes a part of the second stage Fresnel ring of the Fresnel zone plate, and the third intermediate portion 31 constitutes a part of the third stage Fresnel ring of the Fresnel zone plate.

It should be noted that, although each stage Fresnel ring in FIG. 2A is schematically shown to have four steps, the embodiments of the present disclosure are not limited to this. In other embodiments, each stage Fresnel ring stage may have two steps, three steps, and so on.

Figure 2B:
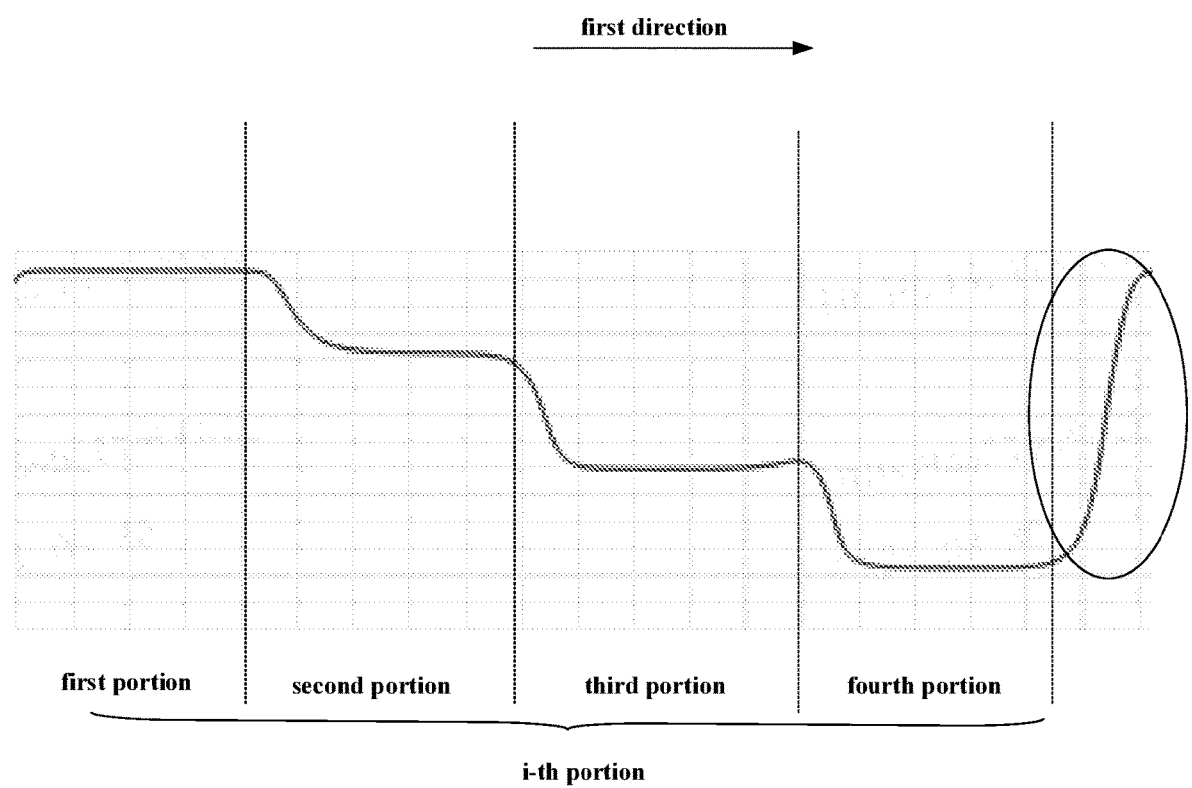
FIG. 2B is a schematic view showing optical path change of i-th intermediate portion along a first direction according to an embodiment of the present disclosure.

FIG. 2B is a schematic view showing optical path change of the i-th intermediate portion along the first direction according to an embodiment of the present disclosure.

As shown in FIG. 2B, the optical paths of four portions of the i-th intermediate portion 31 arranged along the first direction gradually decrease along the first direction. It should be understood that, the optical path of each portion may be substantially the same along the first direction, while the optical paths of different portions exhibit a gradually decreasing trend along the first direction.

It should be noted that, in an ideal case, the topography at a junction position of adjacent two stage Fresnel rings is the case shown in FIG. 2A, that is, having a vertical surface. However, in practice, the topography at a junction position of adjacent two stage Fresnel rings is the case shown by the ellipse in FIG. 2B, that is, there is a transition zone shown by the ellipse.

By providing a barrier wall, the topography of the transition zone can be corrected, thereby helping to reduce the length of the transition zone along the first direction.

In the above embodiments, at least one intermediate portion 31 comprises at least one barrier wall of the above barrier walls. In this way, it is helpful to reduce the length of the transition zone at a junction position of adjacent two stage Fresnel rings along the first direction to reduce the divergence of light by the transition zone, thereby improving the focusing effect of the liquid crystal lens.

For the ease of description, hereinafter, the "transition zone at a junction position of adjacent two stage Fresnel rings" is simply referred to as "transition zone".

The inventors have noticed that, in a case where a second electrode 22a is under a barrier wall, an electric field might be formed between this second electrode 22a and other second electrodes 22a, which is not favorable for the correction effect of the barrier wall. Accordingly, the embodiments of the present disclosure also provide the following solutions.

In some embodiments, the j-th intermediate portion 31 comprises at least one of the first barrier wall 312a or the second barrier wall 312b. In this case, as shown in FIGS. 1A and 1B, a second electrode 22a is not under the first barrier wall 312a and a second electrode 22a is not under the second barrier wall 312b. In this way, it is helpful to further reduce the length of the transition zone along the first direction, thereby further improving the focusing effect of the liquid crystal lens.

In some embodiments, to further improve the focusing effect of the liquid crystal lens, each intermediate portion 31 may comprise at least one of the first barrier wall 312a or the second barrier wall 312b.

As some implementations, the refractive index of at least one of the first barrier wall 312a or the third barrier wall 312c is greater than the ordinary light refractive index (no) of the liquid crystal layer 311. For example, the refractive index of each of the first barrier wall 312a and the third barrier wall 312c is equal to the extraordinary light refractive index (ne) of the liquid crystal layer 311. In this way, it is ensured that the optical paths of a plurality of portions of each intermediate portion 31 gradually decreases along the first direction without additionally providing other layer(s) for adjusting a refractive index in the region of the liquid crystal lens corresponding to the barrier wall (at least one of the first barrier wall 312a or the third barrier wall 312c), thereby improving the focusing effect of the liquid crystal lens with a simple structure.

As some implementations, the refractive index of at least one of the second barrier wall 312b or the fourth barrier wall 312d is smaller than the extraordinary light refractive index of the liquid crystal layer 311. In this way, it is ensured that the optical paths of a plurality of portions of each intermediate portion 31 gradually decreases along the first direction without additionally providing other layer(s) for adjusting a refractive index in the region of the liquid crystal lens corresponding to the barrier wall (at least one of the second barrier wall 312b or the fourth barrier wall 312d), thereby improving the focusing effect of the liquid crystal lens with a simple structure.

As some implementations, the extraordinary light refractive index of the liquid crystal layer 311 is 1.82, and the ordinary light refractive index of the liquid crystal layer 311 is 1.52.

In some embodiments, the liquid crystal lens may be in an on state or an off state. In the on state, a specific voltage is applied between the plurality of groups of second electrodes and the first electrodes 12, and at this time, the liquid crystal lens can focus light. In the off state, no voltage is applied between the plurality of groups of second electrodes and the first electrodes 12, and at this time, the liquid crystal lens can transmit light.

In some embodiments, the absolute value of the difference between the refractive index of at least one barrier wall and the extraordinary light refractive index of the liquid crystal layer 311 is smaller than or equal to 0.1. For example, the absolute value may be 0.05, 0.02, and so on. In this way, the liquid crystal lens in the non-operational state can allow the light to pass more uniformly.

In some embodiments, one barrier wall in at least one intermediate portion 31 is in contact with the first electrode 12 and in contact with the insulating layer 23. For example, as shown in FIG. 1A, the first barrier wall 312a in the first intermediate portion 31 is in contact with the first electrode 12 and the insulating layer 23. For another example, as shown in FIG. 1B, the second barrier wall 312b in the first intermediate portion 31 is in contact with the first electrode 12 and the insulating layer 23.

In this way, the barrier wall in contact with the first electrode 12 and the insulating layer 23 can play the role of supporting the first substrate structure 10 and the second substrate structure 20, thereby helping to improve the reliability of the liquid crystal lens.

In some embodiments, some barrier walls in the liquid crystal lens are in contact with the first electrode 12 and the insulating layer 23; and other barrier walls are in contact with the insulating layer 23, but not contact with the first electrode 12. For example, the thickness of the liquid crystal layer is 2.5 microns, some barrier walls have a thickness of 2.5 microns and other barrier walls have a thickness of 2.4 microns.

In some embodiments, the surface of a barrier wall in contact with the first electrode 12 and the insulating layer 23 away from the second substrate 21 has a recessed region which is not in contact with the first electrode 12, and the region of the surface of the barrier wall away from the second substrate 21 other than the recessed region is in contact with the first electrode 12. In this way, it is more convenient for the liquid crystal to flow between different intermediate portions 31, so that the liquid crystal in the liquid crystal lens is more uniformly distributed.

In some embodiments, the liquid crystal lens may further comprise a support (not shown in FIGS. 1A-1D) located between the first substrate structure 10 and the second substrate structure 20. As some implementations, the support may be of a same material as the plurality of barrier walls. For example, the support and the plurality of barrier walls may be formed by a same patterning process.

To improve the correction effect of the barrier wall to further improve the focusing effect of the liquid crystal lens, the inventors have studied the height, extension direction, position, and shape of the barrier wall, and provide the following technical solutions.

In some embodiments, the ratio of the height of at least one barrier wall to the thickness of the liquid crystal layer 311 is greater than or equal to 0.8 and smaller than or equal to 1, for example 0.9, 0.95, and so on. When the ratio of the height of the barrier wall to the thickness of the liquid crystal layer 311 is within the above range, the length of the transition zone along the first direction can be further reduced to further improve the focusing effect of the liquid crystal lens.

In some embodiments, at least one barrier wall and the N groups of second electrodes extend along a second direction that is not parallel to the first direction. The second direction is the same as the long axis direction of the liquid crystal in the liquid crystal layer 311. In some embodiments, the second direction is perpendicular to the first direction. Description will be made below in conjunction with FIGS. 3A and 3B.

Figure 3A:
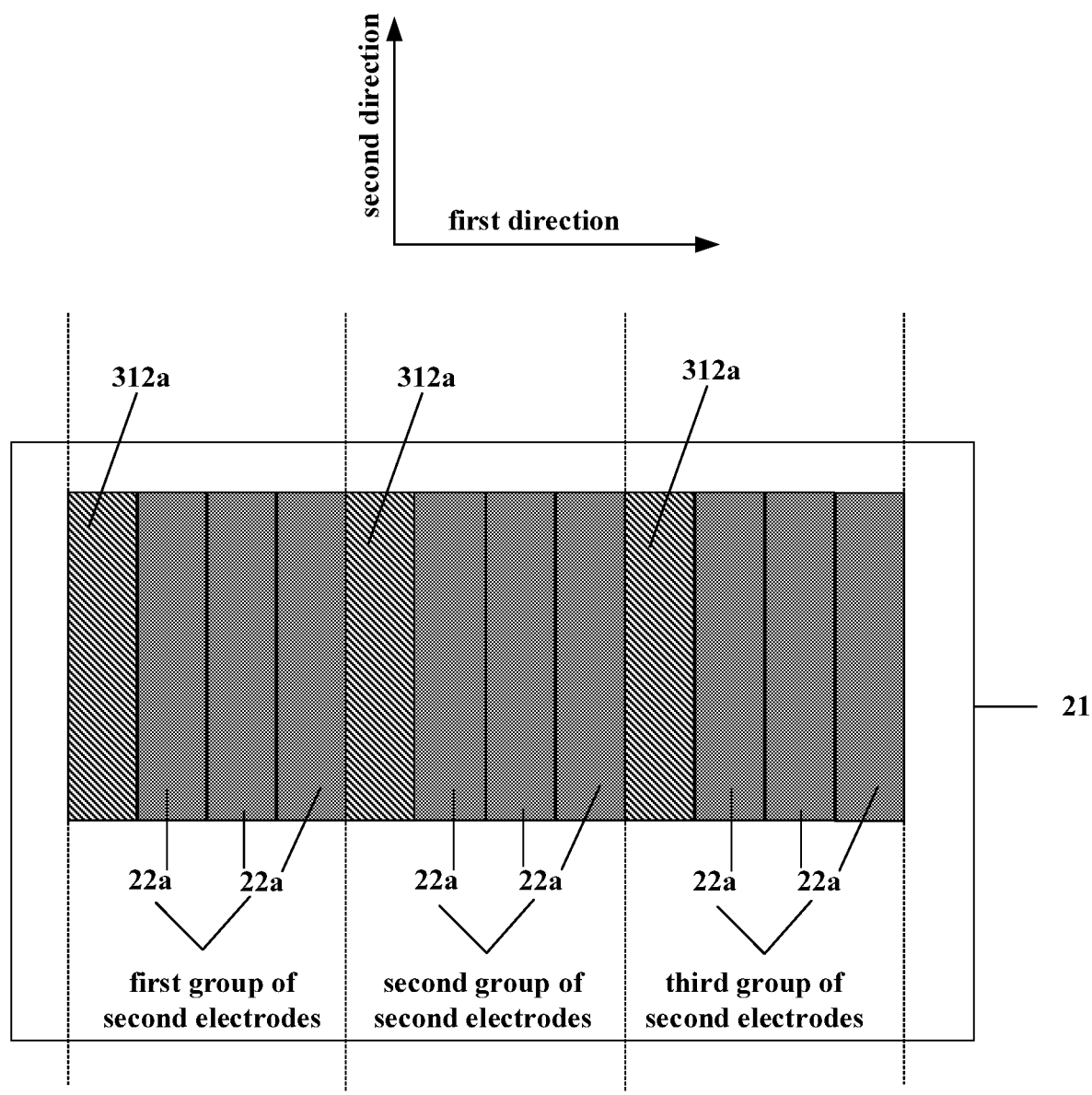
FIG. 3A is a schematic top view showing an intermediate layer in the liquid crystal lens shown in FIG. 1A.
Figure 3B:
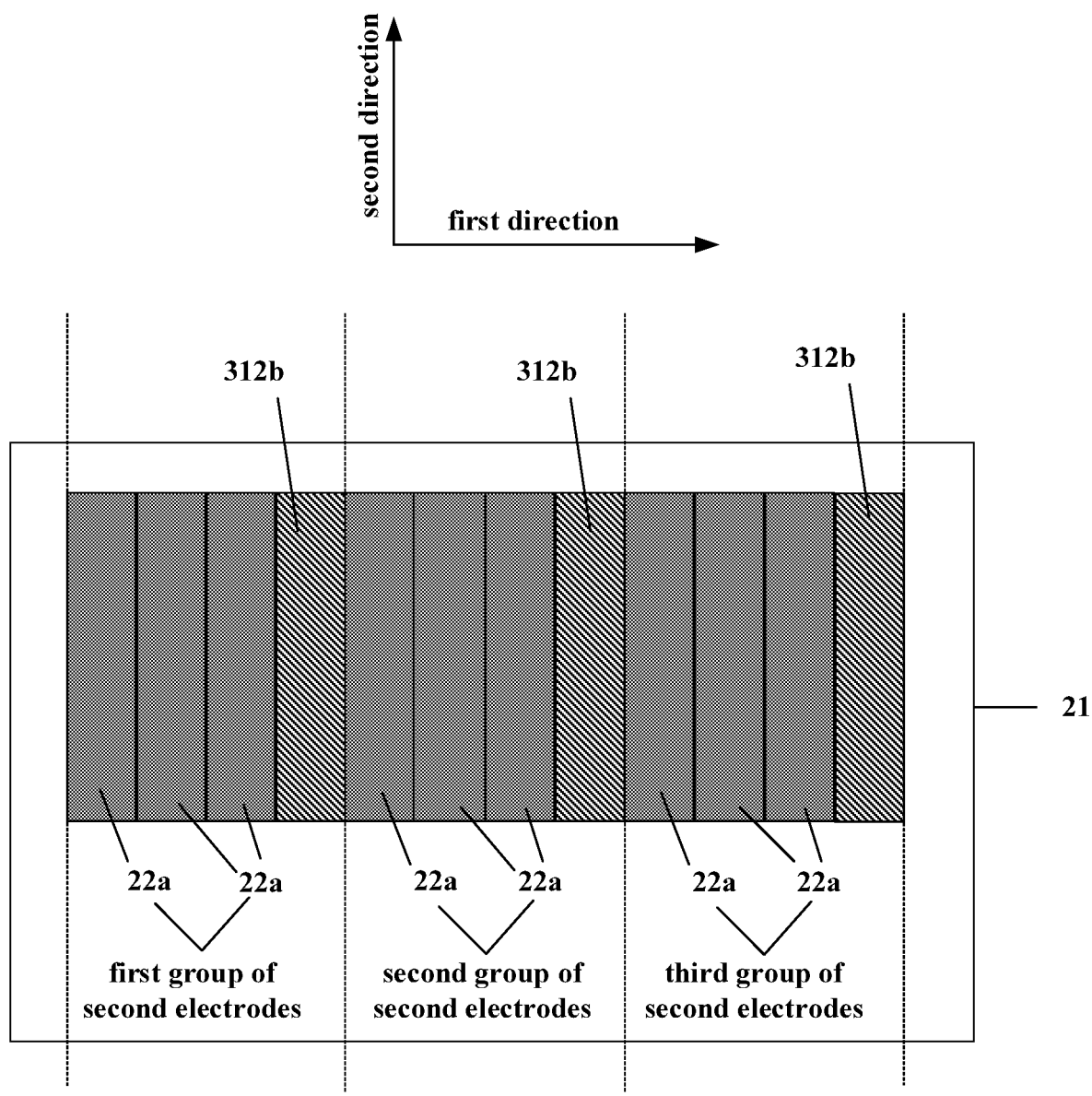
FIG. 3B is a schematic top view showing an intermediate layer in the liquid crystal lens shown in FIG. 1B.

FIG. 3A is a schematic top view showing an intermediate layer in the liquid crystal lens shown in FIG. 1A; and FIG. 3B is a schematic top view showing an intermediate layer in the liquid crystal lens shown in FIG. 1B.

As shown in FIGS. 3A and 3B, the first barrier wall 312a and the second barrier wall 312b extend along the second direction that is not parallel to the first direction, and three groups of second electrodes in the liquid crystal lens also extend along the second direction.

In the above embodiments, the extension direction of at least one barrier wall and the N groups of second electrodes is the second direction which is the same as the long axis direction of the liquid crystal in the liquid crystal layer 311. In this way, the barrier wall is prevented from adversely affecting the topography of the steps of the Fresnel ring formed by the liquid crystal layers on both sides of the barrier wall.

The orthographic projection of the first barrier wall 312a in the i-th intermediate portion 31 on the second substrate 21 shown in FIG. 3A is adjacent to the orthographic projection of the first second electrode in the i-th group of second electrodes on the second substrate 21, and the orthographic projection of the second barrier wall 312b in the i-th intermediate portion 31 on the second substrate 21 shown in FIG. 3B is adjacent to the orthographic projection of the M-th second electrode in the i-th group of second electrodes on the second substrate 21. It should be understood that, this is not restrictive. In some embodiments, the orthographic projection of the first barrier wall 312a in the i-th intermediate portion 31 on the second substrate 21 is spaced apart from the orthographic projection of the first second electrode in the i-th group of second electrodes on the second substrate 21. Similarly, the orthographic projection of the second barrier wall 312b in the i-th intermediate portion 31 on the second substrate 21 may be spaced apart from the orthographic projection of the M-th second electrode in the i-th group of second electrodes on the second substrate 21.

In some embodiments, the orthographic projection of at least one barrier wall in at least one intermediate portion 31 on the second substrate 21 is in a rectangular shape. For example, referring to FIGS. 3A and 3B, the orthographic projection of each of the first barrier wall 312a and the second barrier wall 312b on the second substrate 21 is in a rectangular shape.

As some implementations, the shape of at least one barrier wall in at least one intermediate portion 31 is in a rectangular parallelepiped shape. As other implementations, the shape of the cross section of at least one barrier wall in at least one intermediate portion 31 taken by a plane parallel to the surface of the second substrate 21 is trapezoid.

Figure 4A:
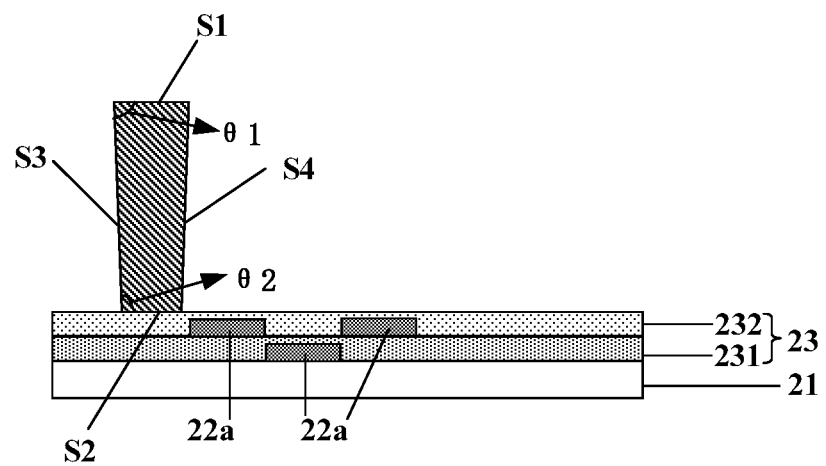
FIGS. 4A and 4B are schematic views showing that the shape of cross section of the barrier wall according to some embodiments of the present disclosure is trapezoid.
Figure 4B:
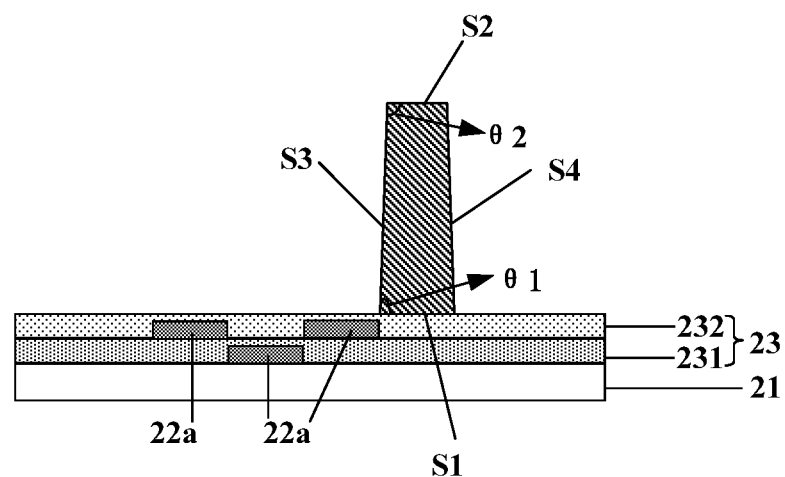

FIGS. 4A and 4B are schematic views showing that the shape of cross section of the barrier wall according to some embodiments of the present disclosure is trapezoid. In the following description, the cross section of the barrier wall refers to the cross section of the barrier wall taken by a plane parallel to the surface of the second substrate 21.

As shown in FIGS. 4A and 4B, the trapezoid comprises a first side S1 and a second side S2 that are parallel, and a third side S3 and a fourth side S4 that are not parallel. Each of the third side S3 and the fourth side S4 is connected to the first side S1 and the second side S2. The first comprised angle $\theta 1$ between the first side S1 and the third side S3 is smaller than the second comprised angle $\theta 2$ between the second side S2 and the third side S3. Here, the first comprised angle $\theta 1$ is greater than or equal to 85 degrees. In this way, the length of the transition zone along the first direction can be further reduced, thereby further improving the focusing effect of the liquid crystal lens.

In some implementations, the i-th intermediate portion comprises the first barrier wall 312a, and in the cross section of the first barrier wall 312a, the second side S2 is more proximate to the second substrate 21 than the first side S1, as shown in FIG. 4A. In such implementations, the correction effect of the first barrier wall 312a is more apparent, and the length of the transition zone along the first direction is further reduced, thereby further improving the focusing effect of the liquid crystal lens.

In other implementations, the i-th intermediate portion comprises the second barrier wall 312b, and in the cross section of the second barrier wall 312b, the first side S1 is more proximate to the second substrate 21 than the second side S2, as shown in FIG. 4B. In such implementations, the correction effect of the second barrier wall 312b is more apparent, and the length of the transition zone along the first direction is further reduced, thereby further improving the focusing effect of the liquid crystal lens.

Figure 5:
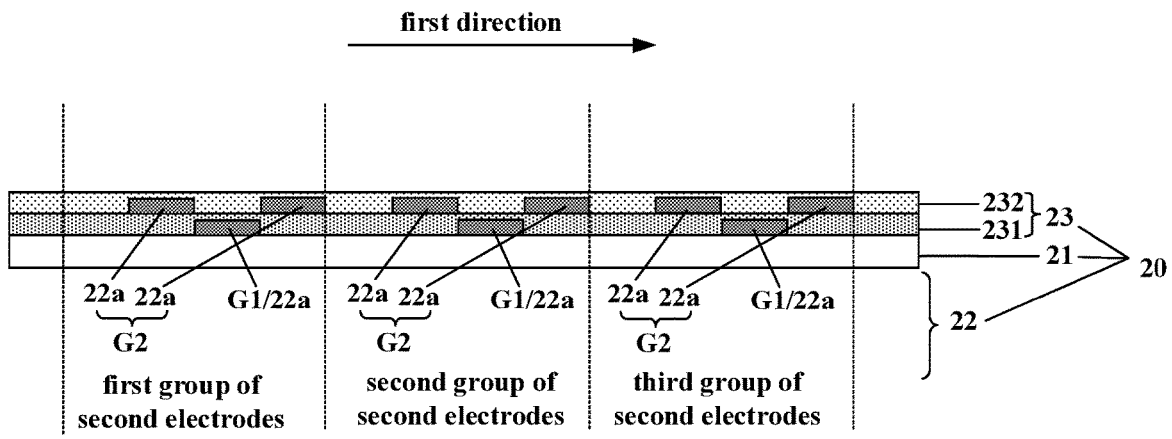
FIG. 5 is a schematic view showing a second substrate structure according to an embodiment of the present disclosure.

FIG. 5 is a schematic view showing a second substrate structure according to an embodiment of the present disclosure.

As shown in FIG. 5, in the second substrate structure 20, M second electrodes 22a in each group of second electrodes comprise a first group of electrodes G1 and a second group of electrodes G2. The insulating layer 23 comprises a first insulating layer 231 and a second insulating layer 232.

The first insulating layer 231 is located on one side of the second substrate 21 proximate to the first substrate structure 10 and located between the first group of electrodes G1 and the second group of electrodes G2. The second insulating layer 232 is located on one side of the second group of electrodes G2 away from the second substrate 21 and covers the second group of electrodes G2. For example, the first insulating layer 231 is an inorganic layer, and the second insulating layer is an organic layer.

In each group of second electrodes, one second electrode 22a of any two adjacent second electrodes 22a in M second electrodes 22a belongs to the first group of electrodes G1, and the other second electrode 22a of the any two adjacent second electrodes 22a belongs to the second group of electrodes G2.

In the above embodiments, the insulating layer 23 comprises a plurality of layers, and two adjacent second electrodes 22a in each group of second electrodes are located on the surfaces of different layers. In this way, it is helpful to reduce the mutual interference between two adjacent second electrodes 22a.

In some embodiments, the edge of the orthographic projection of one second electrode 22a of any two adjacent second electrodes 22a on the second substrate 21 proximate to the other second electrode 22a completely coincides with the edge of the orthographic projection of the other second electrode 22a on the second substrate 21 proximate to the one second electrode 22a. In this way, each second electrode 22a can control the liquid crystal above respectively to reduce the amount of liquid crystal in the liquid crystal layer that cannot be controlled by the second electrode 22a, thereby making the Fresnel rings formed more accurate.

Figure 6:
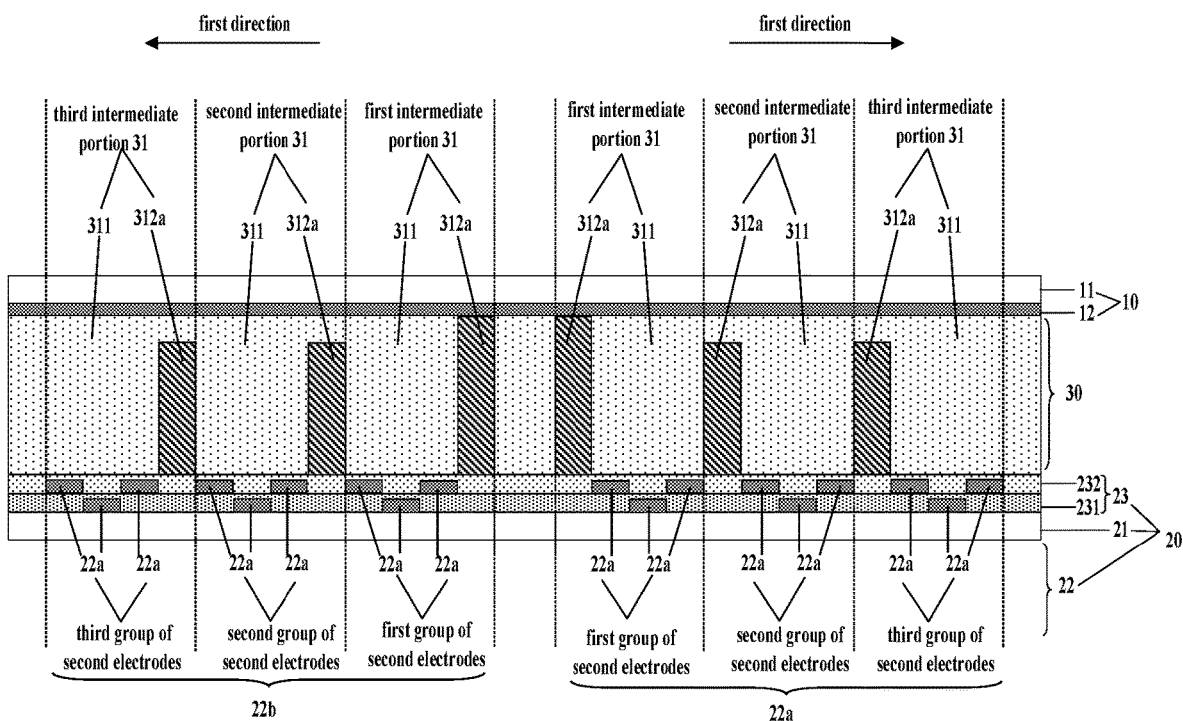
FIG. 6 is a schematic structural view showing a liquid crystal lens according to another embodiment of the present disclosure.

FIG. 6 is a schematic structural view showing a liquid crystal lens according to another embodiment of the present disclosure.

As shown in FIG. 6, the electrode structures 22 in the liquid crystal lens comprise a first electrode structure 22a and a second electrode structure 22b which are axially symmetrical. Here, the first direction corresponding to the first electrode structure 22a is opposite to the first direction corresponding to the second electrode structure 22b.

It can be understood that, in this case, the intermediate layer 30 comprises N intermediate portions 31 arranged sequentially from 1 to N along the first direction corresponding to the first electrode structure 22a, and the intermediate layer 30 comprises N intermediate portions 31 arranged sequentially from 1 to N along the first direction corresponding to the second electrode structure 22b.

It should be noted that, FIG. 6 only shows schematically that the intermediate portions 31 each comprise the first barrier wall 312a, which is not restrictive. In some embodiments, some intermediate portions 31 may comprise the first barrier wall 312a, some intermediate portions 31 may comprise the second barrier wall 312c, some intermediate portions 31 may comprise the third barrier wall 312c, and some intermediate portions may comprise the fourth barrier wall 312d.

In the above embodiments, the electrode structures 22 in the liquid crystal lens comprise the first electrode structure 22a and the second electrode structure 22b which are axially symmetrical. In this way, the focusing effect of the liquid crystal lens can be further improved.

In some embodiments, the liquid crystal lens is configured such that the i-th intermediate portion 31 constitutes the i-th stage Fresnel ring of the Fresnel zone plate, in a case where a same voltage is present between the k-th second electrode 22a in different groups of second electrodes among N group of second groups and the first electrode 12, and different voltages are present between different second electrodes among a same group of second electrodes and the first electrode 12, where 1≤k≤M.

For example, M=3, a same first voltage is present between the 1st second electrode 22a in each group of second electrodes and the first electrode 12, a same second voltage is present between the 2nd second electrode 22a in each group of second electrodes and the first electrode 12, and a same third voltage is present between the 3rd second electrode 22a in each group of second electrodes and the first electrode 12. The third voltage, the second voltage and the first voltage are different from each other. In some embodiments, the third voltage, the second voltage and the first voltage decrease sequentially.

Figure 7A:
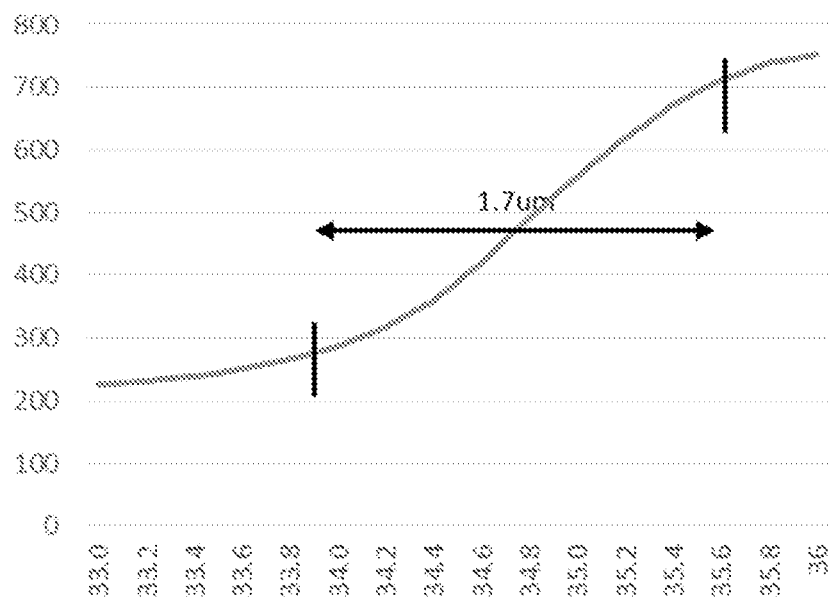
FIGS. 7A-7C are schematic views showing transition zones according to some embodiments of the present disclosure.
Figure 7B:
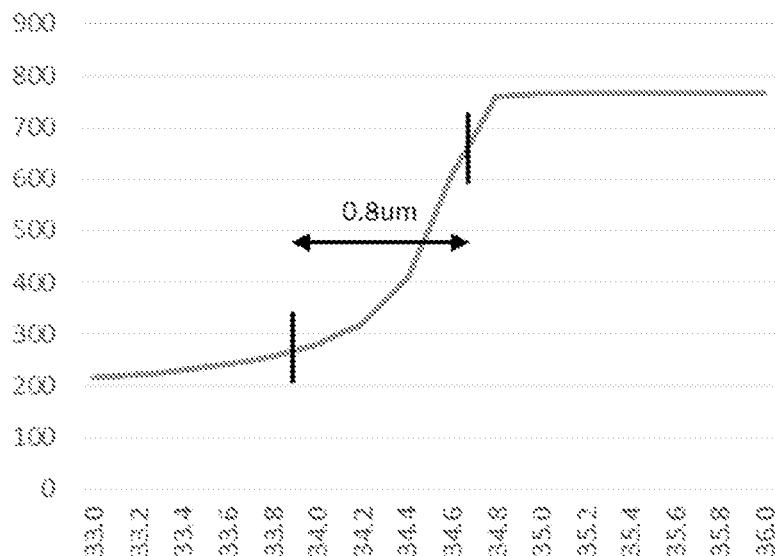
Figure 7C:
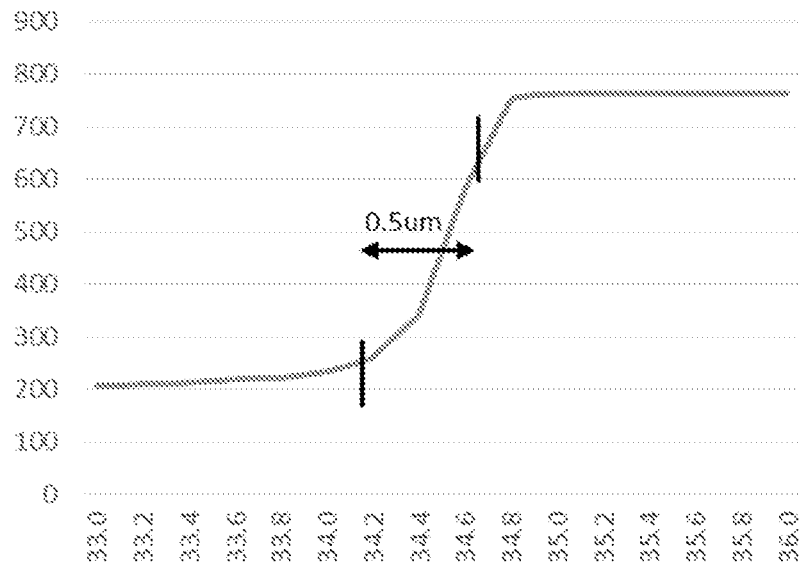

FIGS. 7A-7C are schematic views showing transition zones according to some embodiments of the present disclosure.

It should be noted that, in FIGS. 7A-7C, the transition zone refers to the zone between the position corresponding to 10% of the difference between the maximum optical path and the minimum optical path and the position corresponding to 90% of the difference.

In FIG. 7A, each intermediate portion is not provided with a barrier wall. In this case, the length of the transition zone is about 1.7 microns.

In FIG. 7B, each intermediate portion comprises the third barrier wall 312c shown in FIG. 1C. The thickness of the liquid crystal layer 311 is 2.5 microns, the height of the third barrier wall 312c is 2.4 microns, and the length of the second electrode 22a along the first direction is 10 microns.

The voltage between the 1st second electrode and the first electrode 12 in each group of second electrodes is 0, the voltage between the 2nd second electrode and the first electrode 12 in each group of second electrodes is 2.26, the voltage between the 3rd second electrode and the first electrode 12 in each group of second electrodes is 3.37, and the voltage between the 4-th second electrode and the first electrode 12 in each group of second electrodes is 5.9.

In this case, the length of the transition zone is about microns. Similarly, in a case where each intermediate portion comprises the fourth barrier wall 312d shown in FIG. 19, the length of the transition zone is about 0.8 microns.

In FIG. 7C, each intermediate portion comprises the first barrier wall 312a shown in FIG. 1A. The thickness of the liquid crystal layer 311 is 2.5 microns, the height of the first barrier wall 312a is 2.4 microns, and the length of each of the first barrier wall 312a and the second electrode 22a along the first direction is 10 microns.

The voltage between the 1st second electrode and the first electrode 12 in each group of second electrodes is 2.6, the voltage between the 2nd second electrode and the first electrode 12 in each group of second electrodes is 3.3, and the voltage between the 3rd second electrode and the first electrode 12 in each group of second electrodes is 5.9.

In this case, the length of the transition zone is about 15 microns. Similarly, in the case where each intermediate portion comprises the second barrier wall 312b shown in FIG. 1B, the length of the transition zone is about 0.5 microns.

In addition, in the case where the length of the first barrier wall 312a along the first direction is 5 microns and other parameters are the same as FIG. 7C, the length of the transition zone is also about 0.5 microns.

It can be seen that, by providing a barrier wall in the intermediate portion, the length of the transition zone can be reduced, thereby improving the focusing effect of the liquid crystal lens.

The embodiments of the present disclosure also provide a control method of the liquid crystal lens according to any of the above embodiments. The control method comprises controlling a predetermined voltage to be preset between N groups of second electrodes and the first electrode, such that the i-th intermediate portion constitutes a part of the i-th stage Fresnel ring of the Fresnel zone plate, and the optical paths of a plurality of portions of the i-th intermediate portion arranged along the first direction gradually decrease along the first direction.

As some implementations, a same voltage is controlled to be present between the k-th second electrode in different groups of second electrodes of the N groups of second electrodes and the first electrode, and different voltages are controlled to be present between different second electrodes in a same group of second electrodes of the N groups of second electrodes and the first electrode, where $1 \leq k \leq M$.

Figure 8:
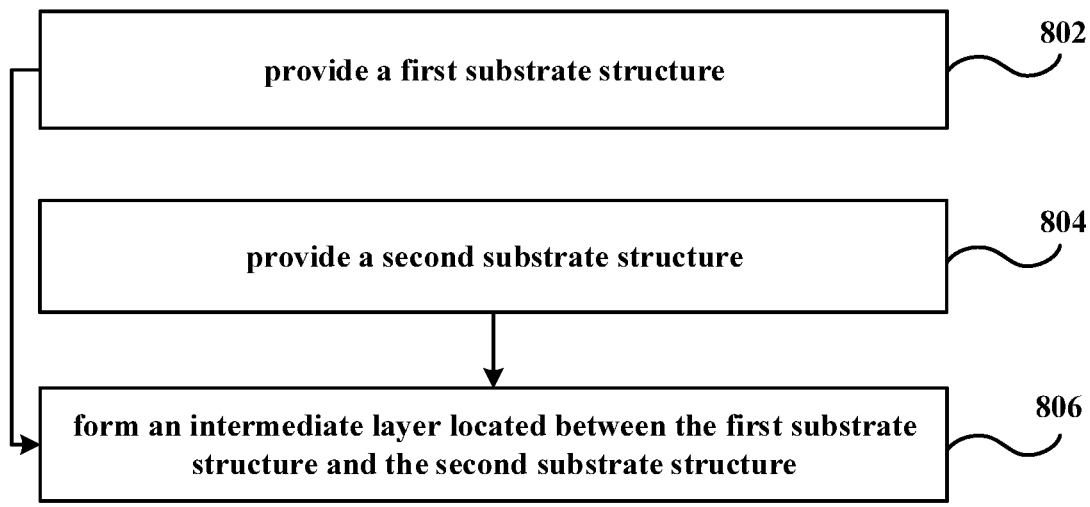
FIG. 8 is a flowchart showing a manufacturing method of a liquid crystal lens according to an embodiment of the present disclosure.

FIG. 8 is a flowchart showing a manufacturing method of a liquid crystal lens according to an embodiment of the present disclosure.

At step 802, a first substrate structure is provided. The first substrate structure comprises a first substrate, and a first electrode located on one side of the first substrate.

At step 804, a second substrate structure is provided. The second substrate structure comprises a second substrate, at least one electrode structure and an insulating layer.

The above at least one electrode structure is located on one side of the second substrate, and each electrode structure comprises N groups of second electrodes arranged sequentially from 1 to N along a first direction corresponding to each electrode structure, and each group of second electrodes comprise M second electrodes arranged sequentially from 1 to M along the first direction, where N and M are both integers greater than or equal to 2.

The insulating layer is located on one side of the above at least one electrode structure away from the second substrate and covers the above at least one electrode structure.

At step 806, an intermediate layer located between the first substrate structure and the second substrate structure is formed. The intermediate layer comprises N intermediate portions arranged sequentially from 1 to N along the first direction. After the intermediate layer is formed, the second substrate structure is located on one side of the first electrode away from the first substrate, and the above at least one electrode structure in the second substrate structure is located between the first electrode and the second substrate.

The orthographic projections of the i-th group second electrode on the second substrate is located within the orthographic projection of the i-th intermediate portion on the second substrate, and the orthographic projections of the i-th intermediate portion on the second substrate does not overlap with the orthographic projections of other groups of second electrodes than the i-th group second electrode in N-group of second electrodes, where $1 \leq i \leq N$.

Each intermediate portion comprises a liquid crystal layer, and the j-th intermediate portion comprises at least one barrier wall of a plurality of barrier walls comprising a first barrier wall, a second barrier wall, a third barrier wall and a fourth barrier wall. The first barrier wall is located on one side of the first second electrode of the j-th group of second electrodes away from the M-th second electrode of the j-th group of second electrodes, the second barrier wall is located on one side of the M-th second electrode of the j-th group of second electrodes away from the first second electrode of the j-th group of second electrodes, the orthographic projection of the third barrier wall on the second substrate is located within the orthographic projection of the first second electrode of the j-th group of second electrodes, and the orthographic projection of the fourth barrier wall on the second substrate is located within the orthographic projection of the M-th second electrode of the j-th group of second electrodes, where j is one or more integers of 1 to N.

In a case where a predetermined voltage is present between the N groups of second electrodes and the first electrode, the i-th intermediate portion constitutes a part of the i-th stage Fresnel ring of the Fresnel zone plate, and the optical paths of a plurality of portions of the i-th intermediate portion arranged along the first direction gradually decrease along the first direction.

It should be noted that, before forming the intermediate layer, a cavity may be enclosed first by a sealing member, the first substrate structure and the second substrate structure, and then liquid crystal is filled in the cavity. For example, the sealing member may be in contact with the periphery of the first substrate structure and the periphery of the second substrate structure respectively.

In the liquid crystal lens formed in the above embodiments, at least one intermediate portion comprises at least one barrier wall of the above plurality of barrier walls. In this way, it is helpful to reduce the length of the transition zone at a junction position of adjacent two stage Fresnel rings along the first direction to reduce the divergence of light by the transition zone, thereby improving the focusing effect of the liquid crystal lens.

The present disclosure also provides an electronic device, which may comprise the liquid crystal lens according to any one of the above embodiments. In some embodiments, the electronic device may be a virtual reality (VR) device, an augmented reality (AR) device, a 3D display device, a light field display device, a mobile terminal, or myopia glasses, etc.

Hereto, various embodiments of the present disclosure have been described in detail. Some details well known in the art are not described to avoid obscuring the concept of the present disclosure. According to the above description, those skilled in the art would fully know how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments and equivalently substitution of part of the technical features can be made without departing from the scope and spirit of the present disclosure. The scope of the disclosure is defined by the following claims.

What is claimed is:

1. A liquid crystal lens, comprising:
a first substrate structure comprising a first substrate and a first electrode located on one side of the first substrate;
a second substrate structure located on one side of the first electrode away from the first substrate, comprising:
a second substrate,
at least one electrode structure located between the first electrode and the second substrate, each electrode structure of the at least one electrode structure comprising N groups of second electrodes arranged sequentially from 1 to N along a first direction corresponding to each electrode structure, each group of second electrodes of the N groups of second electrodes comprising M second electrodes arranged sequentially from 1 to M along the first direction, where N and M are integers greater than or equal to 2, and
an insulating layer located on one side of the at least one electrode structure away from the second substrate and covering the at least one electrode structure; and
an intermediate layer located between the first substrate structure and the second substrate structure, and comprising N intermediate portions arranged sequentially from 1 to N along the first direction, wherein:
orthographic projections of i-th group of second electrodes on the second substrate is located within an orthographic projection of i-th intermediate portion of the N intermediate portions on the second substrate, and the orthographic projection of the i-th intermediate portion on the second substrate does not overlap with orthographic projections of other groups of second electrodes than the i-th group of second electrodes in the N group of second electrodes, where 1≤i≤N,
each intermediate portion of the N intermediate portions comprises a liquid crystal layer, j-th intermediate portion of the N intermediate portions comprises at least one barrier wall of a plurality of barrier walls comprising a first barrier wall, a second barrier wall, a third barrier wall and a fourth barrier wall, wherein the first barrier wall is located on one side of a first second electrode in j-th group of second electrodes away from M-th second electrode in the j-th group of second electrodes, the second barrier wall is located on one side of the M-th second electrode in the j-th group of second electrodes away from the first second electrode in the j-th group of second electrodes, an orthographic projection of the third barrier wall on the second substrate is located within an orthographic projection of the first second electrode in the j-th group of second electrodes on the second substrate, and an orthographic projection of the fourth barrier wall on the second substrate is located within an orthographic projection of the M-th second electrode in the j-th group of second electrodes on the second substrate, where j is one or more integers of 1 to N, and
the liquid crystal lens is configured such that the i-th intermediate portion constitutes a part of i-th stage Fresnel ring of a Fresnel zone plate, and optical paths of a plurality of portions of the i-th intermediate portion arranged along the first direction gradually decrease along the first direction, in a case where a predetermined voltage is present between the N groups of second electrodes and the first electrode.

2. The liquid crystal lens according to claim 1, wherein the j-th intermediate portion comprises at least one of the first barrier wall or the second barrier wall.

3. The liquid crystal lens according to claim 2, wherein each intermediate portion comprises at least one of the first barrier wall or the second barrier wall.

4. The liquid crystal lens according to claim 1, wherein a refractive index of at least one of the first barrier wall or the third barrier is greater than an ordinary light refractive index of the liquid crystal layer.

5. The liquid crystal lens according to claim 1, wherein a refractive index of at least one of the second barrier wall or the fourth barrier wall is smaller than an extraordinary light refractive index of the liquid crystal layer.

6. The liquid crystal lens according to claim 1, wherein the at least one barrier wall and the N groups of second electrodes extend along a second direction not parallel to the first direction, and the second direction is the same as a long axis direction of liquid crystal in the liquid crystal layer.

7. The liquid crystal lens according to claim 6, wherein the second direction is perpendicular to the first direction.

8. The liquid crystal lens according to claim 1, wherein a barrier wall in at least one intermediate portion is in contact with the first electrode and the insulating layer.

9. The liquid crystal lens according to claim 8, wherein a surface of the barrier wall away from the second substrate has a recessed region not in contact with the first electrode, and a region of the surface other than the recessed region is in contact with the first electrode.

10. The liquid crystal lens according to claim 1, wherein a ratio of a height of the at least one barrier wall to a thickness of the liquid crystal layer is greater than or equal to 0.8 and smaller than or equal to 1.

11. The liquid crystal lens according to claim 1, wherein orthographic projection of the at least one barrier wall on the second substrate is in a rectangular shape.

12. The liquid crystal lens according to claim 11, wherein a shape of a cross section of the at least one barrier wall taken by a plane parallel to a surface of the second substrate is trapezoid.

13. The liquid crystal lens according to claim 12, wherein the trapezoid comprises:
a first side and a second side that are parallel;
a third side and a fourth side that are not parallel and both connected to the first side and the second side, wherein a first comprised angle between the first side and the third side is smaller than a second comprised angle between the second side and the third side, and the first comprised angle is greater than or equal to 85 degrees.

14. The liquid crystal lens according to claim 13, wherein the i-th intermediate portion comprises at least one of the first barrier wall or the second barrier wall, wherein:
in the cross section of the first barrier wall, the second side is more proximate to the second substrate than the first side; and in the cross section of the second barrier wall, the first side is more proximate to the second substrate than the second side.

15. The liquid crystal lens according to claim 1, wherein an absolute value of a difference between a refractive index of the at least one barrier wall and an extraordinary light refractive index of the liquid crystal layer is smaller than or equal to 0.1.

16. The liquid crystal lens according to claim 1, wherein the M second electrodes comprise a first group of electrodes and a second group of electrodes, and the insulating layer comprises:
    a first insulating layer located between the first group of electrodes and the second group of electrodes; and
    a second insulating layer located on one side of the second group of electrodes away from the second substrate and covering the second group of electrodes,
    wherein one second electrode of any two adjacent second electrodes in the M second electrodes belongs to the first group of electrodes, and the other second electrode of the any two adjacent second electrodes belongs to the second group of electrodes.

17. The liquid crystal lens according to claim 16, wherein an edge of an orthographic projection of the one second electrode on the second substrate proximate to the other second electrode completely coincides with an edge of an orthographic projection of the other second electrode on the second substrate proximate to the one second electrode.

18. The liquid crystal lens according to claim 1, wherein the liquid crystal lens is configured such that the i-th intermediate portion constitutes the i-th stage Fresnel ring of the Fresnel zone plate, in a case where a same voltage is present between k-th second electrode in different groups of second electrodes of the N group of second electrodes and the first electrode, and different voltages are present between different second electrodes in a same group of second electrodes and the first electrode, where $1 \leq k \leq M$.

19. The liquid crystal lens according to claim 1, wherein the at least one electrode structure comprises a first electrode structure and a second electrode structure that are axially symmetrical, and the first direction corresponding to the first electrode structure is opposite to the first direction corresponding to the second electrode structure.

20. An electronic device, comprising the liquid crystal lens according to claim 1.

* * * * *